(12) United States Patent
Storage et al.

(10) Patent No.: US 8,387,362 B2
(45) Date of Patent: Mar. 5, 2013

(54) METHOD AND APPARATUS FOR OPERATING GAS TURBINE ENGINE HEAT EXCHANGERS

(76) Inventors: Michael Ralph Storage, Beavercreek, OH (US); Kevin Richard Leamy, Loveland, OH (US); Brian Neal, Highland Heights, KY (US)

( * ) Notice: Subject to any disclaimer, the term of this patent is extended or adjusted under 35 U.S.C. 154(b) by 1179 days.

(21) Appl. No.: 11/550,894

(22) Filed: Oct. 19, 2006

(65) Prior Publication Data

US 2008/0095611 A1   Apr. 24, 2008

(51) Int. Cl.
*F02K 99/00* (2009.01)
*F02K 3/02* (2006.01)

(52) U.S. Cl. .................................. 60/266; 60/226.1

(58) Field of Classification Search ................ 60/226.1, 60/262, 266, 267, 730; 244/53 B; 137/15.1; 165/181, 182, 183, 184
See application file for complete search history.

(56) References Cited

U.S. PATENT DOCUMENTS

| | | | |
|---|---|---|---|
| 3,528,250 A * | 9/1970 | Johnson | ................. 60/762 |
| 4,120,150 A * | 10/1978 | Wakeman | ................. 60/39.091 |
| 4,137,705 A | 2/1979 | Andersen et al. | |
| 4,190,398 A | 2/1980 | Corsmeier et al. | |
| 4,254,618 A * | 3/1981 | Elovic | ................. 60/226.1 |
| 4,503,683 A | 3/1985 | Wieland et al. | |
| 4,601,202 A | 7/1986 | Colman et al. | |
| 5,269,133 A | 12/1993 | Wallace | |
| 5,269,135 A * | 12/1993 | Vermejan et al. | ............. 60/226.1 |
| 5,392,614 A | 2/1995 | Coffinberry | |
| 5,452,573 A | 9/1995 | Glickstein | |
| 5,791,148 A * | 8/1998 | Burrus | ................. 60/752 |
| 5,918,458 A | 7/1999 | Coffinberry et al. | |
| 6,145,296 A | 11/2000 | Rakhmailov | |
| 6,385,987 B2 | 5/2002 | Schlom et al. | |
| 6,460,324 B1 | 10/2002 | Rakhmailov | |
| 6,698,691 B2 | 3/2004 | Porte | |
| 7,140,174 B2 | 11/2006 | Johnson | |
| 7,377,100 B2 | 5/2008 | Bruno et al. | |
| 7,398,641 B2 * | 7/2008 | Stretton et al. | ............. 60/39.093 |
| 7,454,894 B2 * | 11/2008 | Larkin et al. | ................. 60/226.1 |
| 7,946,806 B2 | 5/2011 | Murphy | |
| 2004/0020213 A1 | 2/2004 | Jones | |

(Continued)

FOREIGN PATENT DOCUMENTS

| | | |
|---|---|---|
| DE | 1019866 | 11/1957 |
| DE | 1019866 B | 11/1957 |

(Continued)

OTHER PUBLICATIONS

EP Search Report issued in connection with corresponding to EP Application No. 071186432.3, Apr. 6, 2011.

(Continued)

*Primary Examiner* — Gerald Sung
(74) *Attorney, Agent, or Firm* — Matthew P. Hayden; David J. Clement

(57) ABSTRACT

A method for assembling a turbine engine includes assembling a heat exchanger assembly that includes at least a radially inner plate, a radially outer plate, and a heat exchanger coupled between the radially inner and outer plates, forming the heat exchanger assembly such that the heat exchanger assembly has a substantially arcuate shape, and coupling the heat exchanger to a fan casing such that the heat exchanger is positioned upstream or downstream from the fan assembly.

13 Claims, 9 Drawing Sheets

U.S. PATENT DOCUMENTS

| | | |
|---|---|---|
| 2005/0150970 A1 | 7/2005 | Beutin |
| 2005/0268612 A1* | 12/2005 | Rolt .................................. 60/728 |
| 2006/0042225 A1* | 3/2006 | Bruno et al. ..................... 60/204 |
| 2007/0044451 A1* | 3/2007 | Jones ............................ 60/226.1 |
| 2008/0053060 A1* | 3/2008 | Olver ............................ 60/226.1 |

FOREIGN PATENT DOCUMENTS

| | | |
|---|---|---|
| DE | 1137606 B | 10/1962 |
| EP | 1555406 A1 | 7/2005 |
| EP | 1898069 A2 | 3/2008 |
| GB | 528297 A | 10/1940 |
| GB | 2204361 | 11/1988 |
| JP | 54052216 A | 4/1979 |
| JP | 2005201264 A | 7/2005 |
| WO | 01/69064 A1 | 9/2001 |

OTHER PUBLICATIONS

European Search Report; Application No. 07118642.3-2321, dated Aug. 17, 2011; pp. 12.

Japanese language Office Action for co-pending JP patent application No. 2007-268449 (3 pgs).

English language translation of Japanese Office Action for co-pending JP patent application No. 2007-268449 (3 pgs).

* cited by examiner

METHOD AND APPARATUS FOR OPERATING GAS TURBINE ENGINE HEAT EXCHANGERS

BACKGROUND OF THE INVENTION

This invention relates generally to gas turbine engines, and more particularly, to methods and apparatus for operating gas turbine engines.

Gas turbine engines typically include an inlet, a fan, low and high pressure compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as producing useful work to propel an aircraft in flight or to power a load, such as an electrical generator.

During engine operation, significant heat is produced which raises the temperature of engine systems to unacceptable levels. These systems must be cooled to improve their life and reliability. One example is the lubrication system that is utilized to facilitate lubricating components within the gas turbine engine. The lubrication system is configured to channel lubrication fluid to various bearing assemblies within the gas turbine engine. During operation, heat is transmitted to the lubrication fluid from two sources: from heat generated by sliding and rolling friction by components like bearings and seals within a sump and from heat-conduction through the sump wall due to hot air surrounding the sump enclosure.

To facilitate reducing the operational temperature of the lubrication fluid, at least one known gas turbine engine utilizes a conventional radiator that is disposed in the air stream channeled through the engine allowing air that passes through it to cool the fluid circulating within. However, this method has a significant drawback because it presents an obstacle to the smooth airflow, causing both turbulence and pressure drops, which adversely affect engine performance.

BRIEF SUMMARY OF THE INVENTION

In one aspect, a method for assembling a turbine engine is provided. The method includes assembling a heat exchanger assembly that includes at least a radially inner wall, a radially outer wall, and one or more fluid paths formed by the cavity between the radially inner and outer walls, bending the heat exchanger assembly such that the heat exchanger assembly has a circumferential and axial profile that is substantially similar to the circumferential and axial profile of at least a portion of the bypass duct, and coupling the heat exchanger within in the bypass duct.

In another aspect, a heat exchanger for a gas turbine engine is provided. The heat exchanger includes an arcuate radially inner wall, an arcuate radially outer wall coupled to said radially inner wall such that a cavity is defined therebetween, forming an arcuate heat exchanger which is coupled to a fan casing or booster casing in the bypass duct.

In another aspect, a turbine engine assembly is provided. The turbine engine assembly includes a fan assembly, a booster downstream from said fan assembly, a fan casing substantially circumscribing said fan assembly, a booster casing substantially circumscribing said booster such that a bypass duct is defined between said fan casing and said splitter, and an arcuate heat exchanger coupled at least partially within said cavity such that said heat exchanger is coupled to a fan casing or splitter.

DETAILED DESCRIPTION OF THE INVENTION

Figure 1:
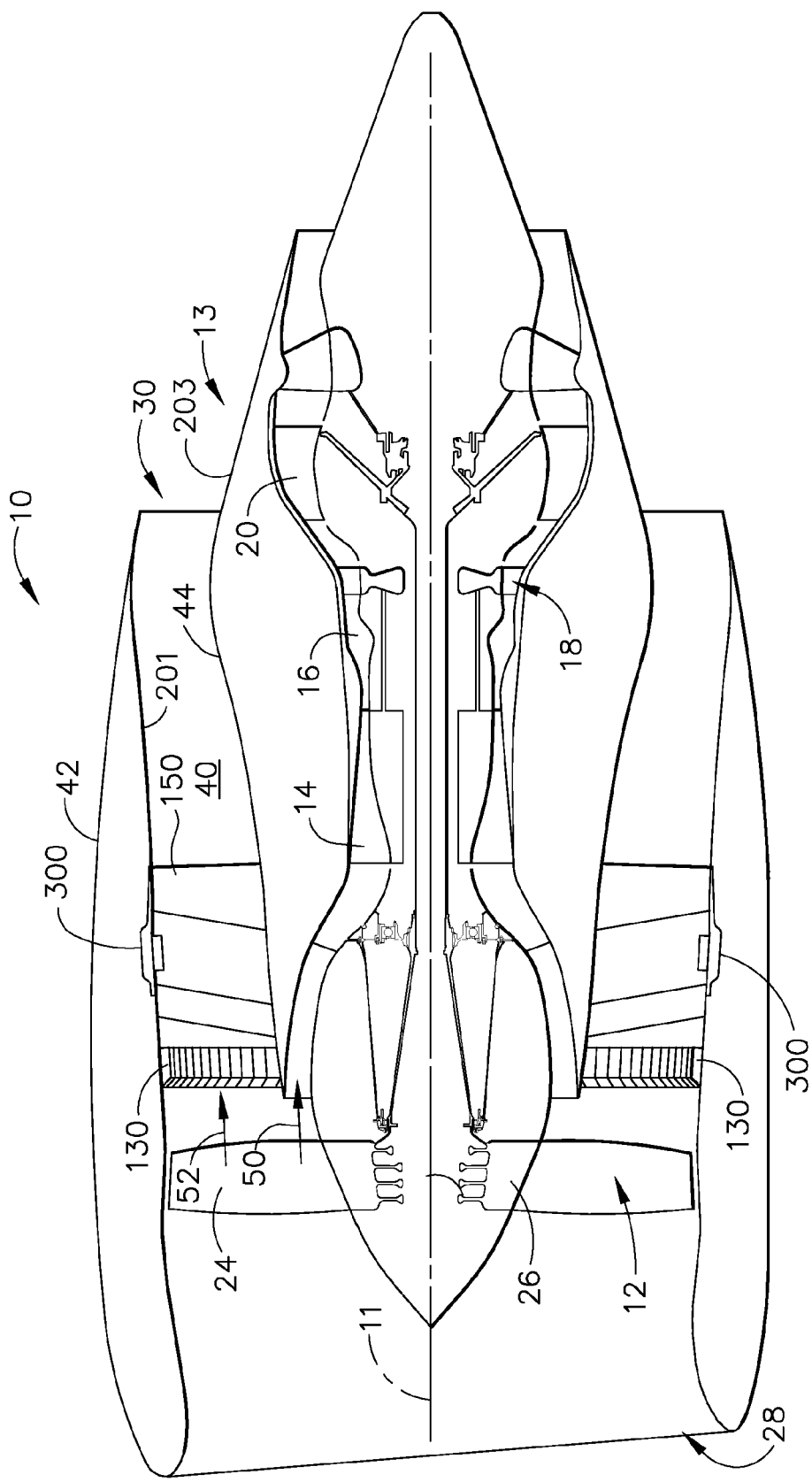
FIG. 1 is schematic illustration of an exemplary gas turbine engine.

FIG. 1 is a schematic illustration of an exemplary gas turbine engine assembly 10 having a longitudinal axis 11. Gas turbine engine assembly 10 includes a fan assembly 12, and a core gas turbine engine 13. Core gas turbine engine includes a high pressure compressor 14, a combustor 16, and a high pressure turbine 18. In the exemplary embodiment, gas turbine engine assembly 10 may also include a low pressure turbine 20. Fan assembly 12 includes an array of fan blades 24 extending radially outward from a rotor disk 26. Engine 10 has an intake side 28 and an exhaust side 30. Gas turbine engine assembly 10 also includes a plurality of bearing assemblies (not shown in FIG. 1) that are utilized to provide rotational and axial support to fan assembly 12, compressor 14, high pressure turbine 18 and low pressure turbine 20, for example.

In operation, air flows through fan assembly 12 and a first portion 50 of the airflow is channeled through compressor 14 wherein the airflow is further compressed and delivered to combustor 16. Hot products of combustion (not shown in FIG. 1) from combustor 16 are utilized to drive turbines 18 and 20 and thus produce engine thrust. Gas turbine engine assembly 10 also includes a bypass duct 40 that is utilized to bypass a second portion 52 of the airflow discharged from fan assembly 12 around core gas turbine engine 13. More specifically, bypass duct 40 extends between an inner wall 201 of a fan casing or shroud 42 and an outer wall 203 of splitter 44.

Figure 2:
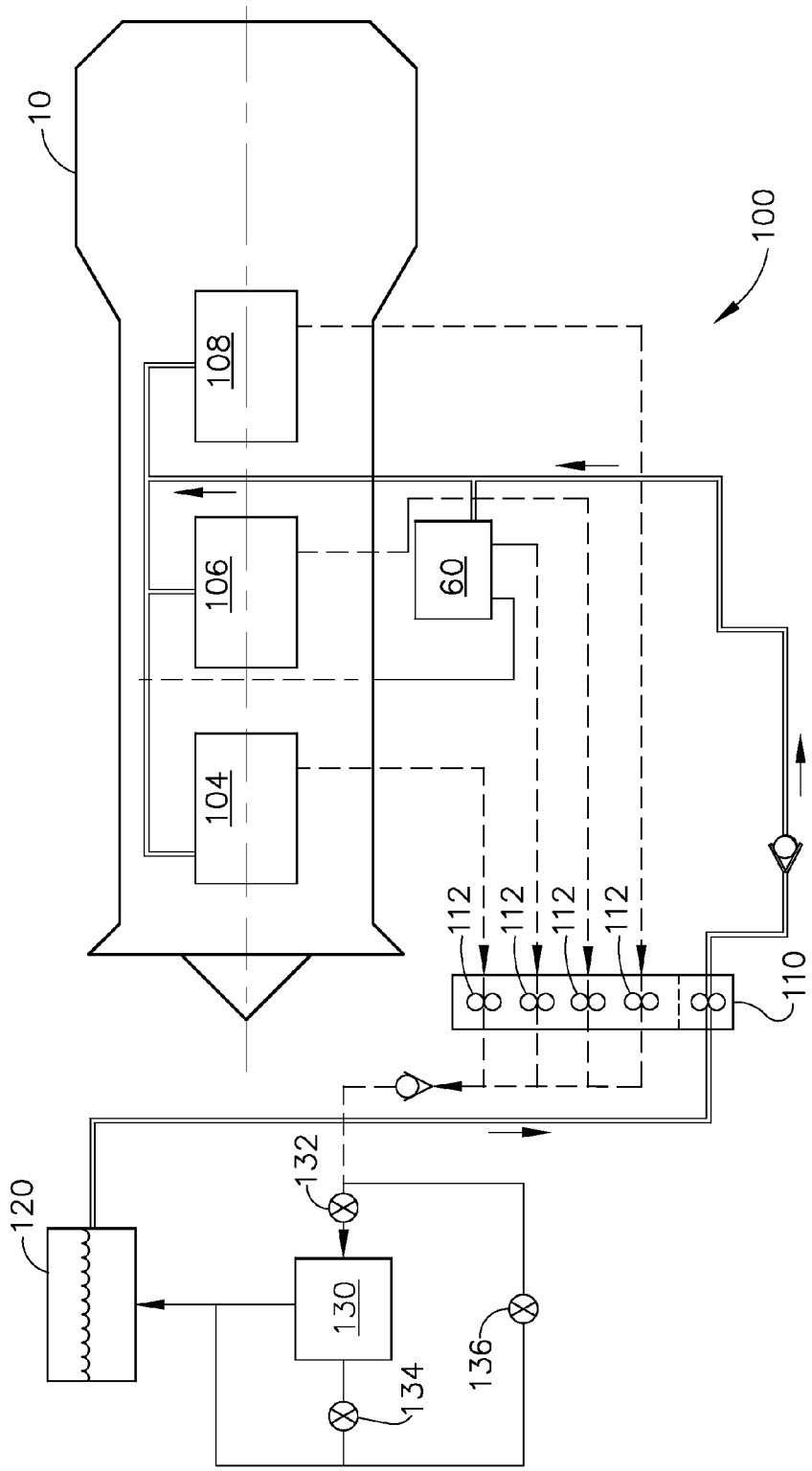
FIG. 2 is a schematic illustration of an exemplary lubrication system that may be utilized with the gas turbine engine shown in FIG. 1.

FIG. 2 is a simplified schematic illustration of an exemplary lubrication oil supply and scavenge system 100 that may be utilized with a gas turbine engine assembly 10 (shown in FIG. 1). In the exemplary embodiment, system 100 includes an oil supply source 120, one or more pumps 110 and 112 which circulate the oil to bearings 104, 106, 108 and to the gearbox 60 and return the hot oil to the oil supply source via heat exchanger assembly 130 which cools it to a lower temperature. Optionally, as in the exemplary embodiment, heat exchanger assembly 130 includes an inlet valve 132, and outlet valve 134, and a bypass valve 136 that may be either manually or electrically operated.

In the exemplary embodiment, heat exchanger assembly 130 is a conformal aircooled heat exchanger that is positioned within bypass duct 40. Optionally, heat exchanger assembly 130 may be utilized in a wide variety of applications on or off the engine. More specifically, although heat exchanger assembly 130 is described herein to cool oil for engine bearings, it may alternatively or simultaneously cool other fluids. For example, it may cool a fluid used to extract heat from generators or actuators used on the engine. It may also be used to cool fluids which extract heat from electronic apparatus such as engine controls. In addition to cooling a wide variety of fluids utilized by a gas turbine engine assembly, it should be realized that heat exchanger assembly 130, and the methods described herein illustrate that heat exchanger assembly 130 may also cool an apparatus that is mounted on the airframe, and not part of the engine. In other applications, the heat exchanger may be mounted remotely from the gas turbine engine, for example on an external surface of the aircraft. Moreover, heat exchanger assembly 130 may be utilized in a wide variety of other applications to either cool or heat various fluids channeled therethrough.

Figure 8:
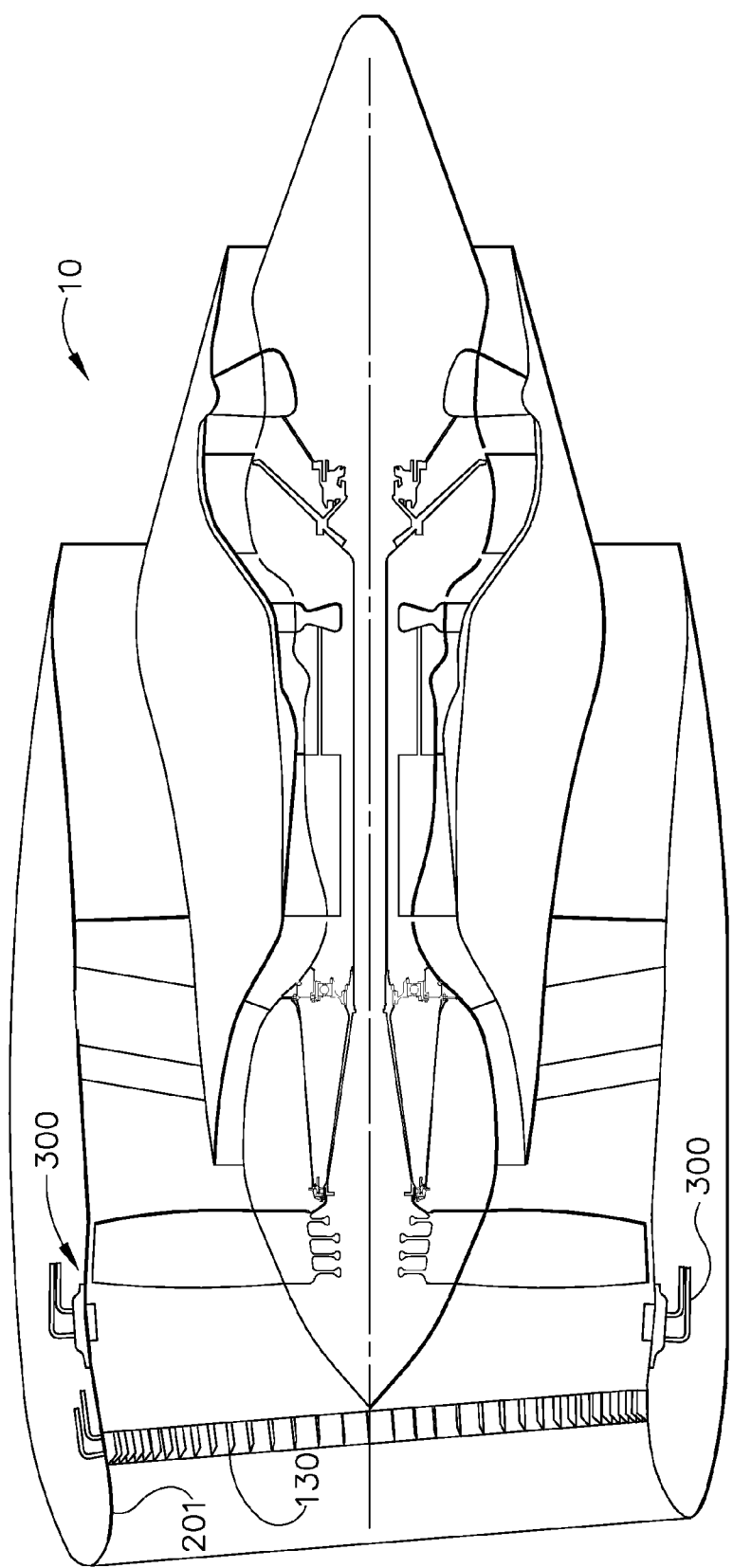
FIG. 8 is a schematic illustration of the exemplary gas turbine engine shown in FIG. 1 including the heat exchangers shown in FIGS. 3 and 5 coupled to an interior surface of the gas turbine engine.

For example, in one embodiment, shown in FIG. 1, heat exchanger 130 is coupled to inner wall 201 of fan shroud 42 between fan assembly 12 and a fan strut 150. Moreover, as shown in FIG. 8, heat exchanger assembly 130 is coupled to inner wall 201, upstream from fan assembly 12, (shown in FIG. 1) such that air channeled into intake side 28 is first channeled through heat exchanger assembly 130 prior to being supplied to fan assembly 12 to facilitate reducing the operating temperature of the fluid channeled through heat exchanger assembly 130. As such, heat exchanger assembly 130 may be positioned anywhere along the axial length of the bypass duct 40 either on the inside of the fan casing 42 or the outside of the splitter 44. In the exemplary embodiment, efficiency is increased when heat exchanger assembly 130 is positioned nearer the engine intake side 28, which is cooler than the engine exhaust side 30.

Figure 3:
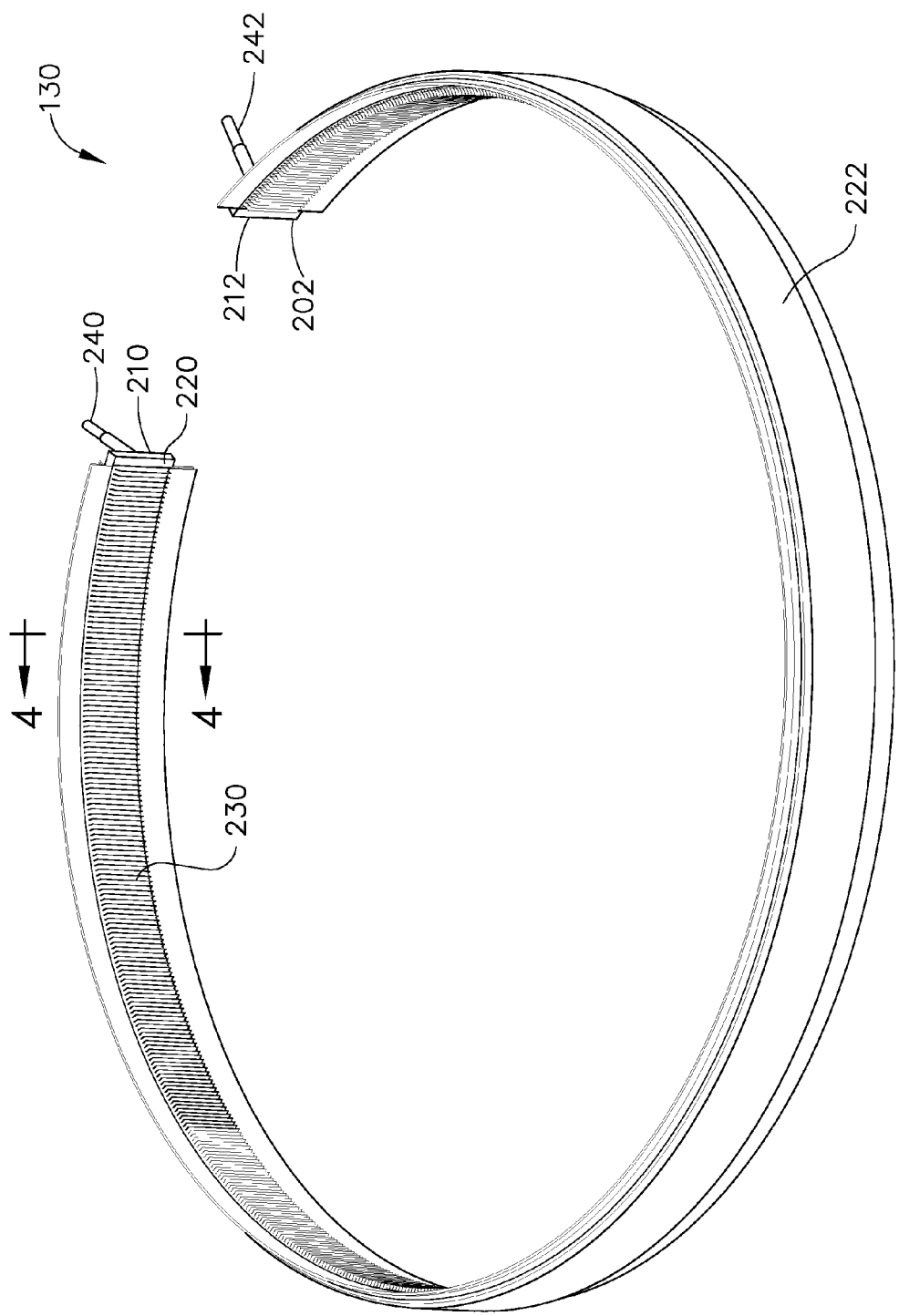
FIG. 3 is a perspective view of an exemplary arcuate heat exchanger that may be utilized with the gas turbine engine shown in FIG. 1.
Figure 4:
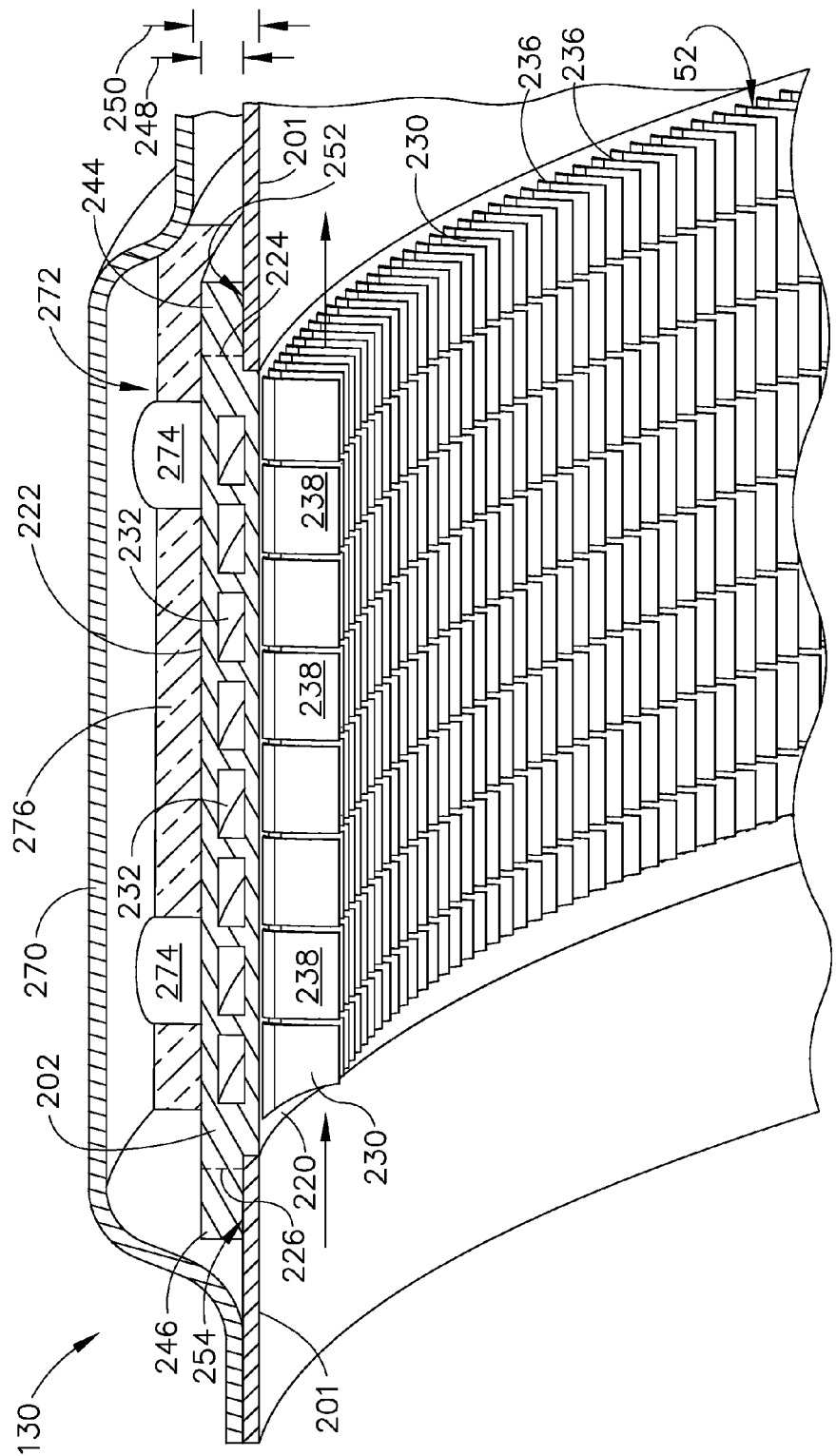
FIG. 4 is a cross-sectional view of the heat exchanger shown in FIG. 3 taken through line 4-4.
Figure 9:
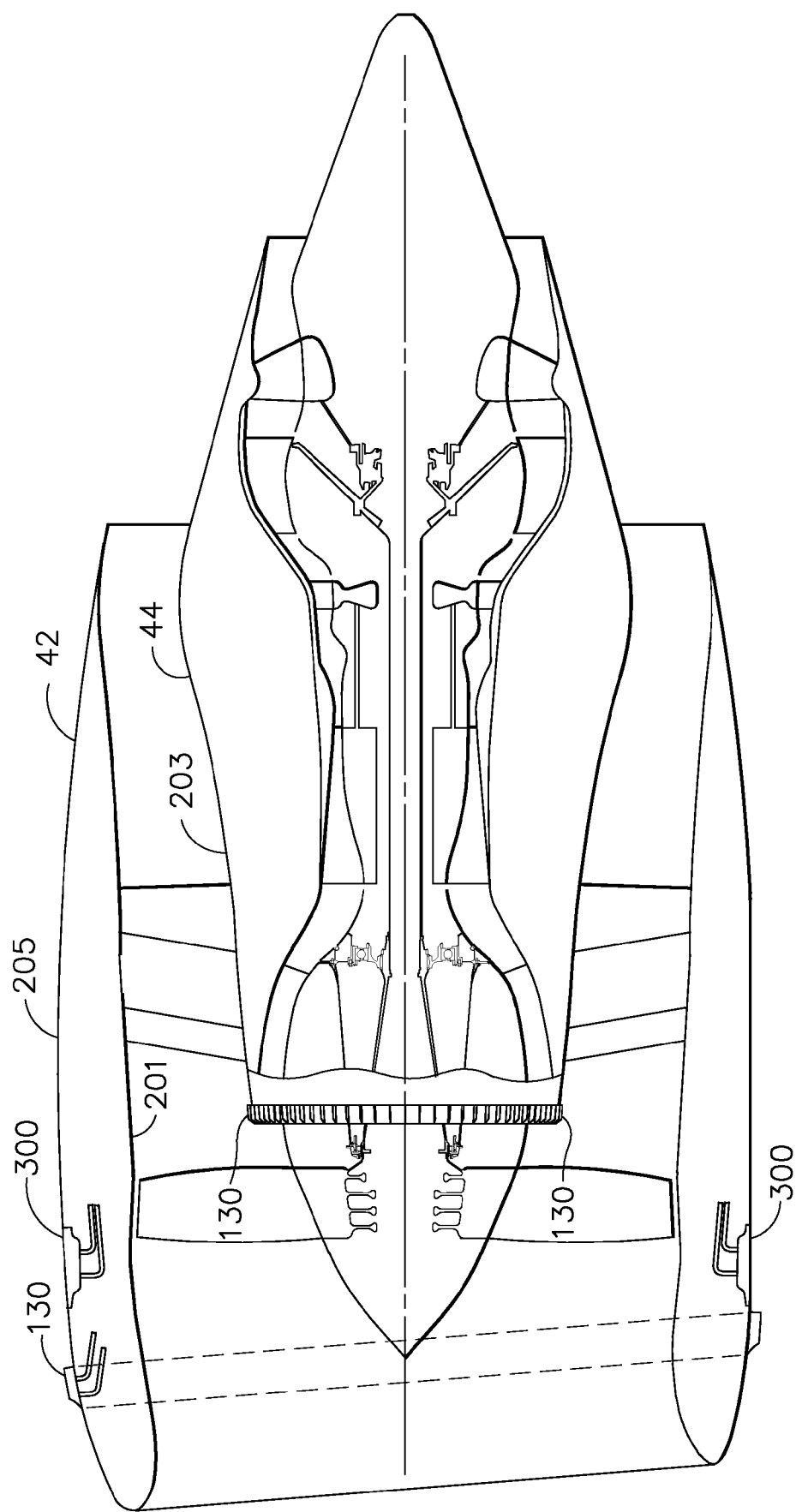
FIG. 9 is a schematic illustration of the exemplary gas turbine engine shown in FIG. 1 including the heat exchangers shown in FIGS. 3 and 5 coupled to an exterior surface of the gas turbine engine.

FIG. 3 is a perspective view of heat exchanger assembly 130 and FIG. 4 is a cross-sectional view of heat exchanger assembly 130 taken through line 4-4 shown in FIG. 3. In the exemplary embodiment, during assembly, heat exchanger assembly 130 is bent such that heat exchanger assembly 130 has a circumferential and axial profile that is substantially similar to the circumferential and axial profile of at least a portion of the bypass duct. More specifically, as shown in FIG. 1, heat exchanger assembly 130 is bent such that is has a circumferential and axial profile that is conforming to the circumferential and axial profile of the inner surface 201 of fan shroud 42 at the location where it is mounted, as shown in FIGS. 1 and 8. As such, heat exchanger 130 has a substantially arcuate shape such heat exchanger assembly 130 may be placed proximate to an inner surface 201 of fan shroud 42 in alternate locations including those shown in FIGS. 1 and 8. Moreover, heat exchanger 130 may also be bent such that is has a circumferential and axial profile that is substantially similar to the circumferential and axial profile of the outer surface of splitter 44 as shown in FIG. 9.

As shown in FIG. 3, the heat exchanger assembly 130 covers substantially all (about 320°) of the circumference. Alternatively, the heat exchanger may be formed by several segments, which are mounted end-to-end to cover the same circumferential length.

Referring again to FIGS. 3 and 4, heat exchanger assembly 130 includes a manifold portion 202 having a first end 210 and an opposite second end 212. Manifold portion 202 also includes a radially inner surface 220, a radially outer surface 222, an upstream wall 226, and an opposite downstream wall 224 such that manifold portion 202 has a substantially rectangular cross-sectional profile. Manifold portion 202 also plurality of cooling fins 230 extending radially inward from radially inner surface 220. Optionally, if heat exchanger 130 is placed proximate to outer surface 205 of fan shroud 42 as shown in FIG. 9, the cooling fins 130 may extend either radially inward as shown in FIGS. 3 and 4, or may extend radially outward, or may include fins that extend both radially inward and radially outward from manifold portion 202. Moreover, if heat exchanger 130 is placed proximate to outer surface 203 of splitter 44 as shown in FIG. 9, the cooling fins 130 may extend either radially inward as shown in FIGS. 3 and 4, or may extend radially outward, or may include fins that extend both radially inward and radially outward from manifold portion 202.

Manifold portion 202 also encloses at least one opening 232 extending lengthwise therethrough that is selectively sized to receive fluid to be cooled therethrough. In the exemplary embodiment, manifold portion 202 includes a plurality of openings 232 extending therethrough. Optionally, manifold portion 202 may include a quantity greater than or less than eight openings 232 based on the cooling reduction desired. In the exemplary embodiment, openings 232 have a substantially rectangular cross-sectional profile. Optionally, openings 232 have a cross-sectional profile that is not rectangular such as for example, circular. Furthermore, these openings are parallel channels that may all carry the same fluid, or they may be segregated into multiple groups where each group carries a different cooling fluid used for different cooling purposes. For example, one group may carry lubrication fluid for the bearings, and another group might carry a separate cooling fluid for electronic apparatus on the engine.

In the exemplary embodiment, cooling fins 230 extend along the width of the manifold between the lateral (upstream and downstream) edges of the manifold and are spaced around the exchanger. As installed in the turbine engine, the fins extend axially along centerline axis 11 in parallel with the airflow direction and are arranged radially around an inside or outside surface of gas turbine engine 10. In the exemplary embodiment, cooling fins 230 are coupled to manifold portion 202 such that each of the cooling fins 230 is substantially perpendicular to openings 232 and such that the direction of the fluid channeled through openings 232 is approximately perpendicular to the direction of airflow channeled through cooling fins 230. More specifically, cooling fins 230 are aligned substantially parallel with centerline axis 11 such that the airflow channeled into or around fan intake 28 is first channeled through a plurality of openings or channels 236 defined between adjacent cooling fins 230. Moreover, although FIG. 4 illustrates each cooling fin 230 as including a plurality of cooling fin segments 238, it should be realized that each cooling fin may be formed as a unitary cooling fin, i.e. does not include segments 238, without effecting the scope of the invention described herein.

In one embodiment, manifold portion 202 is formed utilizing an extrusion process. An integral fin forming process, for example, is then conducted to form the cooling fins 230. Optionally, cooling fins 230 may be attached to manifold portion 202 utilizing a welding or brazing procedure, for example. In the exemplary embodiment, manifold portion 202 and cooling fins 230 are fabricated from a metallic material such as aluminum, for example.

In another embodiment, the upstream-to-downstream width of the manifold 202 may be assembled from several narrower extrusions each containing a subset of the plurality of channels 232 and a subset of the plurality of fins 238. These sections may be connected by welding, brazing, interlocking or other mechanical attachment.

To facilitate channeling a fluid to be cooled through manifold portion 202, heat exchanger assembly 130 also includes one or a plurality of inlet connections 240 that are each coupled to manifold portion first end 210 and one or a plurality of outlet connections 242 that are each coupled to manifold portion second end 212. In the exemplary embodiment, at least one inlet connection 240 is coupled downstream from valve 132 (shown in FIG. 2) and at least one outlet connection 242 is coupled upstream from valve 134 (shown in FIG. 2) such that valves 132 and 134 may be operated to channel lubrication fluid from system 100 through heat exchanger assembly 130 during desired operating conditions. Optionally, a bypass valve 136 may be utilized to bypass the lubrication fluid around heat exchanger assembly 130.

Alternatively, the heat exchanger can be configured to have a plurality of fluid circuits, each with an inlet connection and an outlet connection. These circuits can each have a separate and distinct purpose and carry non-mixing fluids, which are used for cooling different apparatus.

To facilitate securing heat exchanger assembly 130 to gas turbine engine assembly 10, manifold portion 202 includes a first attachment portion 244 that is coupled to downstream wall 224 and a second attachment portion 246 that is coupled to upstream wall 226. More specifically, first and second attachment portions 244 and 246 each have width 248 that is less than a width 250 of manifold portion 202 such that a first shoulder or recess 252 is defined radially inward from first attachment portion 244 and a second shoulder or recess 254 is defined radially inward from second attachment portion 246. In the exemplary embodiment, attachment portions 244 and 246 are each fabricated from the same metallic material as manifold portion 202 and formed unitarily with manifold portion 202 utilizing an extrusion process, for example. Optionally, attachment portions 244 and 246 are formed as separate components that are attached to manifold portion 202 utilizing a welding or brazing procedure, for example.

In the exemplary embodiment, heat exchanger assembly 130 is positioned within gas turbine engine assembly 10 that the inner wall 201 of fan shroud 42 is positioned within respective recesses 252 and 254 and such that the inner surface of inner wall 201 is flush with the surface of manifold 202 at the base of the fins 230 to facilitate reducing or eliminating turbulence caused by heat exchanger assembly 130. More specifically, heat exchanger assembly 130 is coupled within gas turbine engine assembly 10 such that only the cooling fins 230 extend into fan duct 40. As such, the inner wall 201 of fan shroud 42 is utilized to substantially cover manifold portion 202 such that cooling airflow is channeled only through cooling fins 230.

In the exemplary embodiment, a radially outer plate 270, that is fabricated with gas turbine engine 10, is utilized to mount heat exchanger assembly 130. More specifically, the outer plate 270 may be coupled to or formed integrally as part of fan shroud 42. As such, heat exchanger assembly 130 also includes a plurality of standoffs 274 that extend between manifold portion 202 and outer plate 270 to facilitate maintaining manifold portion 202 in a substantially fixed position within a recess 272 that is formed in outer plate 270, and an insulating material 276 that is positioned between standoffs 274 to facilitate reducing heat transfer between manifold portion 202 and an exterior surface of gas turbine engine 10. In the exemplary embodiment, insulating material 276 is a ceramic insulating blanket. Specifically, standoffs 274 are not attached to heat exchanger assembly 130, rather standoffs 274 are utilized to set the height of heat exchanger assembly 130 and thus control its "flushness" with the inner surface of inner wall 201.

During assembly, radially outer plate 270 with preassembled standoffs 274 positioned radially around outer plate 270 are initially attached to gas turbine engine 10. Insulating material 276 is then deposited between standoffs 274, and radially outer plate 270. It is then secured to outer plate 270 utilizing an adhesive, for example. Heat exchanger 130 is pre-bent or shaped such that heat exchanger 130 has a profile that substantially conforms to a profile of fan casing inner surface 201 or fan casing outer surface 203. Heat exchanger assembly 130 is then coupled to gas turbine engine assembly 10 such that such that the inner surface of inner wall 201 is flush with the surface of manifold 202 at the base of the fins 230 as discussed above.

During operation, hot lubrication fluid is channeled from the gas turbine engine 10 through the plurality of openings 232 of heat exchanger 130 and discharged at a substantially cooler temperature to reservoir 120 (shown in FIG. 2). Specifically, the lubrication fluid is channeled in a substantially circumferential orientation within or around gas turbine engine 10. Simultaneously, cooling airflow supplied into or around fan intake 28 is channeled through cooling fins 230 to facilitate reducing an operational temperature of the lubrication fluid channeled through heat exchanger assembly 130.

For example, during operation the relatively warm lubrication fluid is channeled through openings 232 wherein the relatively warm fluid transfers its heat to a conductive surface, i.e. an inner surface 220 of manifold 202 and thus cooling fins 230. The relatively cooler air passing through or around intake 28 is channeled across and/or through cooling fins 230 wherein the heat is transferred from cooling fins 230 to the airflow through the bypass duct 40. As such, the cooling air channeled into fan intake 28 facilitates reducing a temperature of the cooling fins 230, thus reducing a temperature of heat exchanger 130 and therefore a temperature of the fluid channeled through manifold portion 202.

Figure 5:
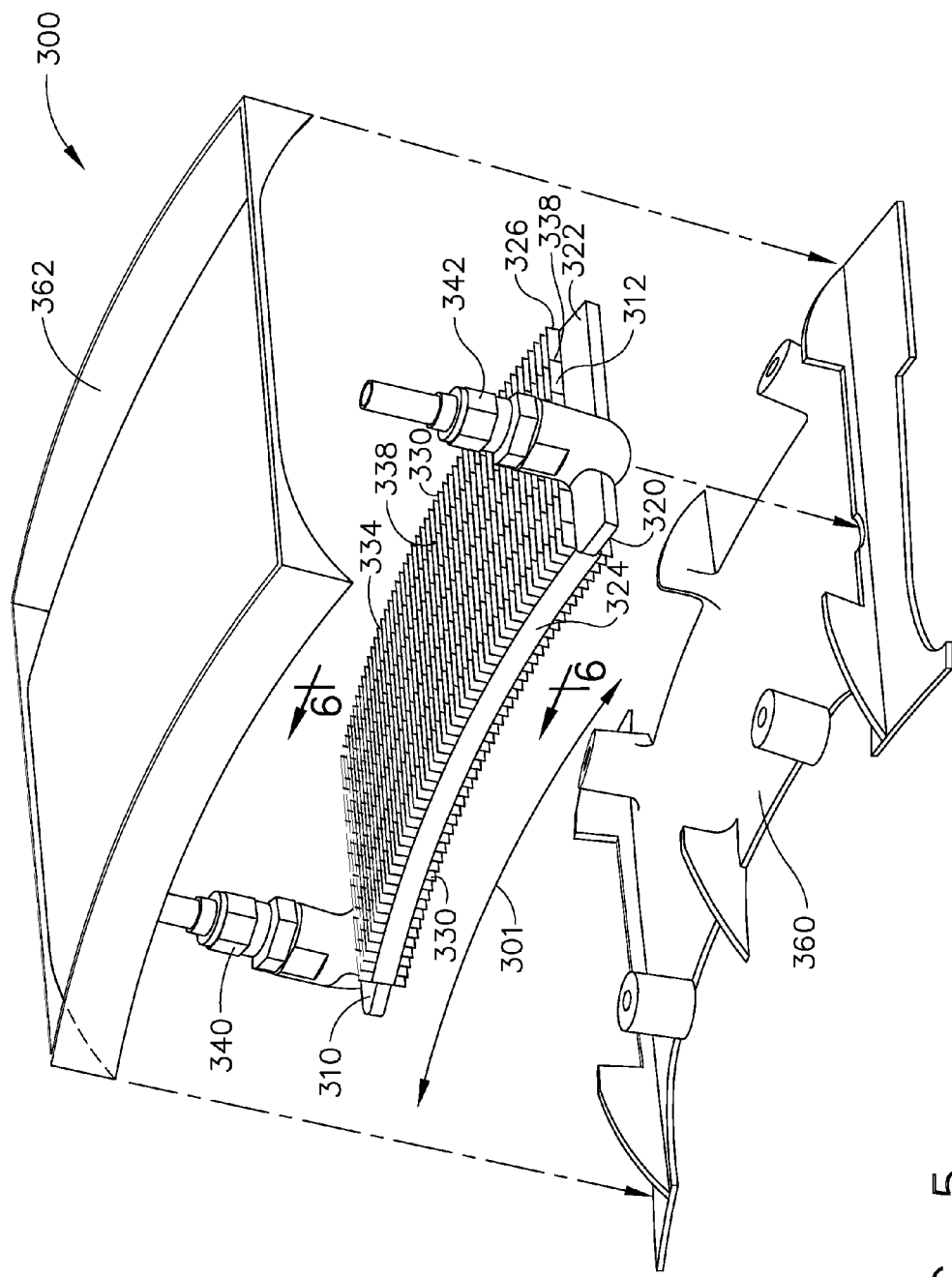
FIG. 5 is a perspective view of another exemplary heat exchanger that may be utilized with the gas turbine engine shown in FIG. 1.
Figure 6:
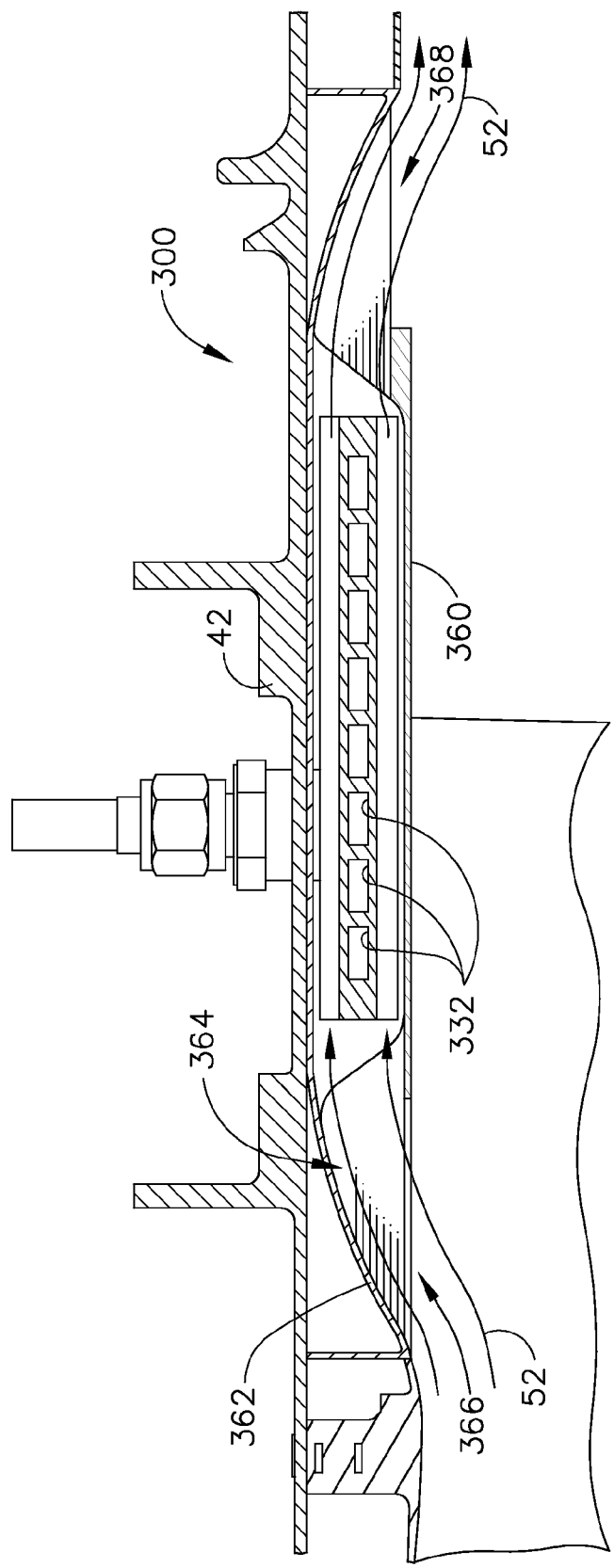
FIG. 6 is a cross-sectional view of the heat exchanger shown in FIG. 5 taken through line 6-6.
Figure 7:
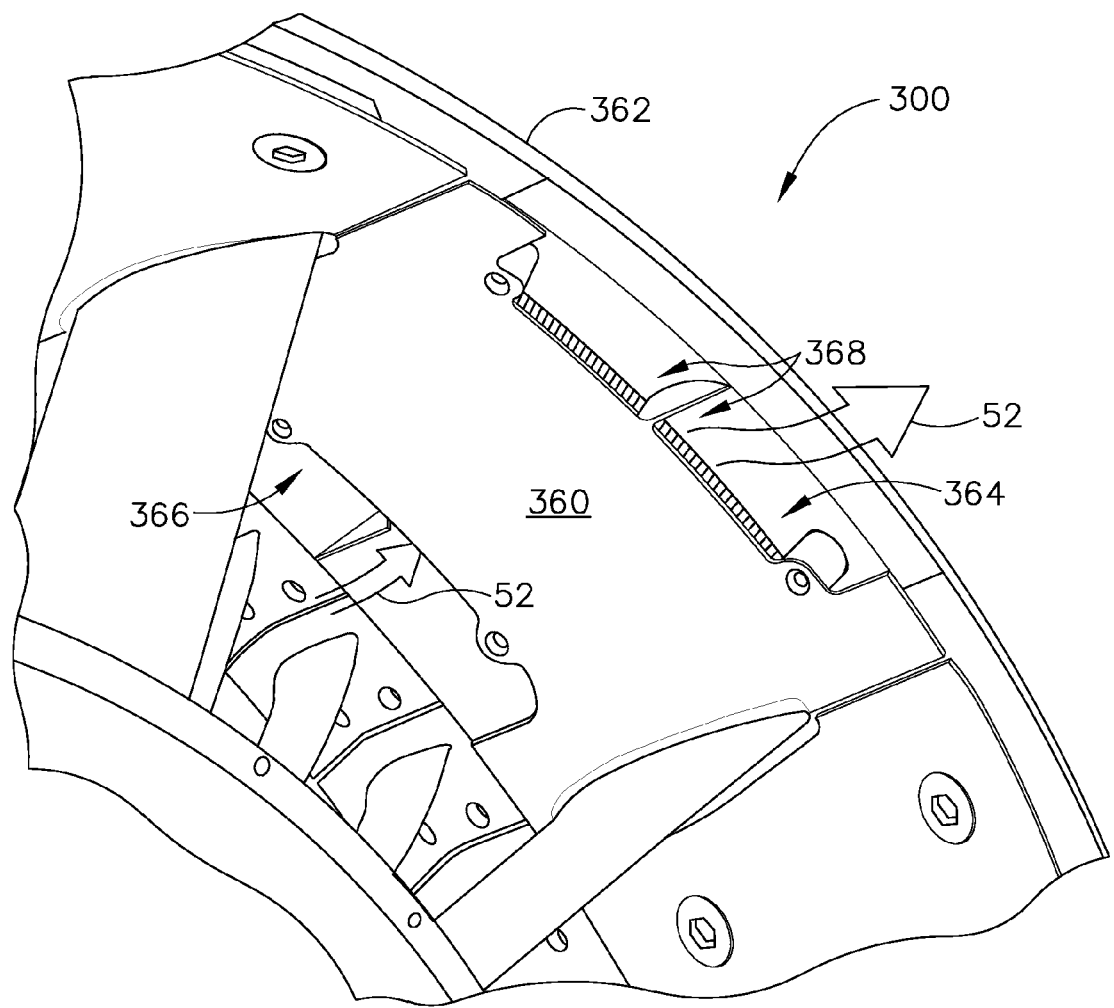
FIG. 7 is a perspective view of the heat exchanger assembly shown in FIG. 5 coupled within the gas turbine engine shown in FIG. 1.

FIG. 5 is a perspective view of another exemplary conformal heat exchanger assembly that may be utilized with gas turbine engine 10 (shown in FIG. 1). FIG. 6 is a cross-sectional view of heat exchanger assembly 300 taken through line 6-6 shown in FIG. 5. FIG. 7 is a perspective view of heat exchanger assembly 300 coupled to gas turbine engine 10. As illustrated, heat exchanger 300 may be utilized in conjunction with heat exchanger 130 to provide additional cooling or independently for cooling a different apparatus. Optionally, heat exchanger 300 may be utilized in lieu of heat exchanger 130 when reduced cooling is required.

In the exemplary embodiment, heat exchanger assembly 300 has a substantially arcuate shape such heat exchanger assembly 300 may be placed proximate to inner surface 201 or outer surface 203 of fan shroud 42 as shown respectively in FIGS. 8 and 9. In the exemplary embodiment, heat exchanger assembly 300 has a length 301 that is substantially less than a length of heat exchanger assembly 130. More specifically, heat exchanger assembly 300 does not substantially circumscribe fan shroud 42, rather heat exchanger 300 has a length 301 that is predetermined based on the cooling capacity required to reduce the operational temperature of the lubrication fluid channeled therethrough whether heat exchanger 300 is used in conjunction with or separately from heat exchanger assembly 130. Additional segments similar to 300 may be located at other places around the circumference, and plumbed such that they are combined when additional cooling is necessary.

Referring to FIGS. 5 and 6, in the exemplary embodiment, heat exchanger 300 includes a first end 310 and an opposite second end 312. Heat exchanger 300 also includes a radially inner surface 320, a radially outer surface 322, a first upstream side 324, and an opposite downstream second side 326 such that heat exchanger 300 has a substantially rectangular cross-sectional profile. Heat exchanger 300 also plurality of cooling fins 330 extending radially inward from radially inner surface 320. Optionally, heat exchanger 300 also includes a plurality of cooling fins 330 that extend radially outward from radially outer surface 322.

Heat exchanger 300 also includes a plurality of openings 332 extending lengthwise therethrough that are each selectively sized to receive fluid to be cooled therethrough. In the exemplary embodiment, heat exchanger 300 includes eight openings 332 extending therethrough. Optionally, heat exchanger 300 may include a quantity greater than or less than eight openings 332 based on the cooling reduction desired. In the exemplary embodiment, openings 332 have a substantially rectangular cross-sectional profile. Optionally, openings 332 have a cross-sectional profile that is not rectangular such as for example, circular. Also, optionally, the plurality of channels may be combined, or may be used in separate and independent cooling circuits.

In the exemplary embodiment, cooling fins 330 extend along the width of the manifold between the lateral edges of the manifold and are spaced around the exchanger. As installed in the turbine engine, the fins extend axially along centerline axis 11 and are arranged radially around an inside surface of gas turbine engine 10. Moreover, cooling fins 330 are coupled to heat exchanger 300 such that each of the cooling fins 330 is substantially perpendicular to openings 332 and such that the direction of the fluid channeled through openings 332 is approximately perpendicular to the direction of airflow channeled through cooling fins 330. More specifically, cooling fins 330 are aligned substantially parallel with centerline axis 11 such that the airflow channeled into or around fan inlet 28 is channeled through a plurality of openings or channels 334 defined between adjacent cooling fins 330. Moreover, although FIGS. 5 and 6 illustrates each cooling fin 330 as being a substantially unitary cooling fin, it should be realized that each cooling fin 330 may be segmented to include a plurality of cooling fin segments 338 without effecting the scope of the invention described herein.

In one embodiment, manifold portion 322 is formed utilizing an extrusion process. An integral fin forming process, for example, is then conducted to form the cooling fins 330. Optionally, cooling fins 330 may be attached to manifold portion 322 utilizing a welding or brazing procedure, for example. In the exemplary embodiment, manifold portion 322 and cooling fins 330 are fabricated from a metallic material such as aluminum, for example.

To facilitate channeling a fluid to be cooled through heat exchanger 300, heat exchanger 300 also includes one or a plurality of inlet connection 340 that are each coupled to first end 310 and one or a plurality of outlet connections 342 that are each coupled to second end 312. In the exemplary embodiment, inlet connection 340 is coupled to downstream from valve 132 (shown in FIG. 2) and outlet connection 342 is coupled upstream from valve 134 (shown in FIG. 2) such that valves 132 and 134 may be operated to channel lubrication fluid from system 100 through heat exchanger assembly 300 during desired operating conditions. Optionally, a bypass valve 136 may be utilized to bypass the lubrication fluid around heat exchanger assembly 300.

In the exemplary embodiment, heat exchanger assembly 300 also includes a radially inner plate 360 that also forms the inner surface 201 of the fan casing and a radially outer plate 362 that define a cavity 364 therebetween. In the exemplary embodiment, heat exchanger 300 is coupled between plates 360 and 362, respectively within cavity 364. In the exemplary embodiment, radially inner plate 360 includes at least one inlet opening 366 that is utilized to channel airflow into cavity 364 and thus across heat exchanger 300. Radially inner plate also includes at least one outlet opening 368 that is positioned downstream from inlet opening 366 such that airflow discharged from cavity 364 is exhausted from the gas turbine engine assembly 10. In the exemplary embodiment, heat exchanger 300 is recessed beneath radially inner plate 360. As such only a portion of airflow inlet airflow is channeled across heat exchanger 300 and the remaining airflow continues on through the bypass duct to the inside of plate 360. Accordingly, as described above, radially inner plate 360 facilitates channeling a portion of the airflow across heat exchanger 300.

During operation, lubrication fluid is channeled from the gas turbine engine 10 through the plurality of openings 332 defined through heat exchanger 300 and discharged to reservoir 120 (shown in FIG. 2). Specifically, the lubrication fluid is channeled in a substantially circumferential orientation within gas turbine engine 10. Simultaneously, cooling airflow supplied through or around fan inlet 28 is channeled through opening 366, across the heat exchanger cooling fins 330, and exhausted through opening 368 to fan assembly 12 to facilitate reducing an operational temperature of the lubrication fluid channeled through heat exchanger assembly 300.

For example, during operation the relatively warm lubrication fluid is channeled through openings 332 wherein the relatively warm fluid transfers its heat to a conductive surface, i.e. an upper and/or lower surface of heat exchanger 300 and thus cooling fins 330. The relatively cooler air supplied via inlet 28 is channeled across and/or through cooling fins 330 wherein the heat is transferred from cooling fins 330 to the airflow channeled through cavity 364. The heated airflow is then discharged from cavity 364 via opening 368 aftward to fan assembly 12.

The above-described conformal heat exchangers are cost-effective and highly reliable in reducing the temperature of any fluid channeled therethrough. More specifically, each heat exchanger assembly includes a heat exchanger having a substantially rectangular cross-sectional profile and a plurality of cooling openings extending therethrough. The heat exchanger also includes a plurality of cooling fins that are coupled to the radially inner surface of the heat exchanger and may also be coupled to the radially outer surface of the heat exchanger. In the exemplary embodiment, the heat exchanger may be fabricated utilizing an extruded aluminum material that intersects the airflow path and has a relatively small cross-sectional profile to facilitate a minimizing pressure loss within the bypass duct that may be attributed to the heat exchanger assembly. Specifically, and in the exemplary embodiment, the fin profiles are between approximately 0.010 and approximately 0.025 inches thick with a fin length between approximately 0.4 and 0.5 inches. Thus, the heat exchanger fins protrude into the airflow stream approximately 0.4 to 0.5 inches, but that is a variable depending on the specific engine. Moreover, when a known "brick" type heat exchanger is installed on a similar engine it resulted in a pressure drop loss of approximately 0.35% SFC. Whereas, the conformal heat exchanger described herein resulted in a pressure drop of approximately 0.06% SFC. As such, the conformal heat exchanger described herein is approximately 4 times larger in heat transfer capacity than the known "brick"

heat exchanger. Therefore, on an equal heat transfer basis, the "conformal" cooler had an SFC impact of approximately 0.015%.

Exemplary embodiments of heat exchanger assemblies are described above in detail. The heat exchanger assemblies are not limited to the specific embodiments described herein, but rather, components of each system may be utilized independently and separately from other components described herein. For example, each heat exchanger assembly may be utilized in a wide variety of gas turbine engines and positioned within a wide variety of locations within the gas turbine engine. Moreover, the heat exchanger assemblies described herein may also be coupled to the radially outer wall of the splitter within the bypass duct, or to an external surface of the fan shroud if desired. Where practical, they can be mounted anywhere there is an airflow which can provide cooling.

While the invention has been described in terms of various specific embodiments, those skilled in the art will recognize that the invention can be practiced with modification within the spirit and scope of the claims.

What is claimed is:

1. A method for assembling a turbine engine to facilitate reducing an operating temperature of a fluid utilized therein, the turbine engine including a core gas turbine engine, a splitter circumscribing the core gas turbine engine, the fan assembly disposed upstream from the core gas turbine engine, a fan casing substantially circumscribing the fan assembly, and a bypass duct that is defined between the fan casing and the splitter, said method comprising: providing an arcuate liquid-to-air heat exchanger that includes: a plurality of channels extending therethrough; a plurality of cooling fins coupled to each of the plurality of channels and configured to receive a flow of air to facilitate reducing a temperature of a liquid flowing through the channels; at least one attachment portion formed unitarily with the heat exchanger, the heat exchanger having a first width, the at least one attachment portion having a second width that is less than the first width such that a recess is defined radially inward from the at least one attachment portion; and at least one inner plate coupled at the recess to facilitate directing airflow over the cooling fins; bending the heat exchanger such that the heat exchanger has a circumferential and axial profile that is substantially conforms to the circumferential and axial profile of the fan duct at the location within the fan duct where the air cooled heat exchanger is mounted; and coupling the heat exchanger within in the bypass duct.

2. A method in accordance with claim 1 further comprising coupling the heat exchanger to an interior surface of the fan casing such that the heat exchanger is positioned upstream or downstream from the fan assembly.

3. A method in accordance with claim 1 wherein assembling a heat exchanger assembly further comprises:
forming a heat exchanger having a plurality of openings extending therethrough;
coupling a plurality of cooling fins to the heat exchanger; and
coupling at least one cover plate to the heat exchanger such that airflow channeled through the bypass duct is channeled over the cooling fins to facilitate reducing the operating temperature of a fluid channeled through the openings.

4. A method in accordance with claim 3 wherein forming a heat exchanger further comprises forming a heat exchanger having a substantially square cross-sectional profile unitarily with the cooling fins.

5. A method in accordance with claim 3 wherein coupling a plurality of cooling fins to the heat exchanger such that the cooling fins are substantially perpendicular to the openings.

6. A method in accordance with claim 1 further comprising:
coupling the radially outer plate to the radially inner plate such that a cavity is defined between the heat exchanger and the outer plate;
coupling a plurality of standoffs between the outer plate and the heat exchanger to facilitate securing the heat exchanger in a relatively fixed position; and
positioning an insulating material between adjacent standoffs, the outer plate, and the heat exchanger.

7. A gas turbine engine assembly comprising:
a core gas turbine engine;
a nacelle circumscribing said core gas turbine engine; and
a heat exchanger assembly disposed within said nacelle, said heat exchanger assembly comprising:
an arcuate liquid-to-air heat exchanger that is circumferentially oriented and is configured to be contacted by a flow of air within the nacelle and outside of the core gas turbine engine said heat exchanger comprising:
a plurality of channels extending therethrough;
a plurality of cooling fins coupled-thereto such that air can flow over said cooling fins to facilitate reducing a temperature of a liquid flowing through said channels;
at least one attachment portion formed unitarily with said heat exchanger, said heat exchanger having a first width, said at least one attachment portion having a second width that is less than the first width such that a recess is defined radially inward from said at least one attachment portion; and
at least one inner plate coupled at the recess to facilitate directing airflow over said cooling fins.

8. A gas turbine engine assembly in accordance with claim 7 wherein said heat exchanger assembly has a profile that is substantially similar to a profile of said nacelle.

9. A gas turbine engine assembly in accordance with claim 7 wherein said heat exchanger is formed unitarily with said cooling fins.

10. A gas turbine engine assembly in accordance with claim 7 wherein said heat exchanger has a substantially rectangular cross-sectional profile and wherein each of said channels has a substantially rectangular cross-sectional profile.

11. A gas turbine engine assembly in accordance with claim 7 further comprising:
an outer plate coupled to said at least one inner plate such that a cavity is defined between said heat exchanger and said outer plate;
a plurality of standoffs coupled between said outer plate and said heat exchanger to facilitate securing said heat exchanger in a substantially fixed position; and
an insulating material positioned between adjacent standoffs, said outer plate, and said heat exchanger.

12. A gas turbine engine assembly in accordance with claim 7 wherein said cooling fins are oriented substantially perpendicular to said channels.

13. A gas turbine engine assembly in accordance with claim 7 wherein said heat exchanger assembly is coupled to said nacelle.

* * * * *